US006513371B1

(12) United States Patent
Jett et al.

(10) Patent No.: US 6,513,371 B1
(45) Date of Patent: Feb. 4, 2003

(54) METHOD FOR DETERMINING FUEL INJECTION RATE SHAPING CURRENT IN AN ENGINE FUEL INJECTION SYSTEM

(75) Inventors: Bryan T. Jett, Lowell, MI (US); Hans-Joachim Schulz, Grand Rapids, MI (US); David Huber, Hudsonville, MI (US)

(73) Assignee: Diesel Technology Company, Kentwood, MI (US)

( * ) Notice: Subject to any disclaimer, the term of this patent is extended or adjusted under 35 U.S.C. 154(b) by 3 days.

(21) Appl. No.: 09/919,005

(22) Filed: Jul. 31, 2001

(51) Int. Cl.[7] ............................................ G01M 15/00

(52) U.S. Cl. ................................................... 73/119 A

(58) Field of Search .............................. 73/116, 119 A, 73/118.1, 117.3; 123/446, 456, 501, 496, 500

(56) References Cited

U.S. PATENT DOCUMENTS 4,579,096 A * 4/1986 Kobayashi et al. ......... 123/299
5,138,997 A * 8/1992 Fehlmann .................. 123/449
5,715,788 A * 2/1998 Tarr et al. .................. 123/297
5,738,071 A * 4/1998 Smith, Jr. et al. ........... 123/357
5,878,720 A * 3/1999 Anderson et al. ........... 123/496
5,931,159 A * 8/1999 Mack ......................... 123/446
6,019,091 A 2/2000 Spoolstra
6,158,419 A 12/2000 Jett et al.
6,227,166 B1 * 5/2001 Mack ......................... 133/446

FOREIGN PATENT DOCUMENTS

EP 1 055 814 A2 11/2000

* cited by examiner

*Primary Examiner*—Eric S. McCall
*Assistant Examiner*—Maurice Stevens
(74) *Attorney, Agent, or Firm*—Brooks & Kushman P.C.

(57) ABSTRACT

A method for calibrating a fuel injection pump for an engine fuel injection system comprising determining the pressure made available to an injector nozzle at a portion of the injection cycle before the top dead center position of the engine crankshaft. A solenoid-operated control valve establishes a rate of fuel delivery through the injector nozzle. The method calculates a boot current for the valve, which will achieve optimum pressure delivery through the nozzle. An electronic controller for the injection system calibrator relies upon an algorithm to find the lowest and the highest boot current level that will achieve injector stability. The logic of the system will increase the precision of the boot current by repeated substitution of incremental current values to determine an upper limit and a lower limit for the boot current.

7 Claims, 7 Drawing Sheets

METHOD FOR DETERMINING FUEL INJECTION RATE SHAPING CURRENT IN AN ENGINE FUEL INJECTION SYSTEM

BACKGROUND OF THE INVENTION

1. Field of the Invention

The invention relates to calibration of a fuel control valve in an injector for an engine fuel injection system.

2. Background Art

Control valve assemblies for fuel injector pumps are designed typically to have a fuel delivery rate and engine crank angle relationship that will achieve an optimum level of engine exhaust gas emissions. Engine emission standards require control of the fuel quantity and timing of the fuel injection at the combustion chamber to match the engine cycle. Effective fuel injection rate shaping will result in a reduced level of oxides of nitrogen and a reduced level of particulates in the engine exhaust gases. Effective rate shaping also affects engine operating efficiency and engine noise.

U.S. Pat. No. 6,158,419 discloses an example of a control valve for an engine fuel injector wherein the actuator for the control valve is capable of shaping the injection rate. This patent is assigned to the assignee of the present invention.

The injector pump of the '419 patent comprises a fuel pumping chamber located in a pump body, and a valve chamber between the pumping chamber and the fuel delivery nozzle. The nozzle delivers fuel under pressure to the combustion chamber of the engine. A valve seat is formed in the valve chamber. A valve in the valve chamber has an axially extending guide portion, which controls fuel delivery past the valve seat and into the injector nozzle portion of the system. The valve also has a sealing surface that is movable in the valve chamber between a valve closed position and a valve open position. When the valve is in the closed position, the valve sealing surface engages the valve seat. In the open position, the valve sealing surface is spaced from the valve seat. The valve has a stepped portion that extends a limited distance from the sealing surface, which provides a limited pressure relief as an injector pumping piston is stroked.

A valve spring urges the valve toward its open position. An electromagnetic actuator urges the valve toward its closed position against the bias of the valve spring.

An injector that would be calibrated in accordance with the invention would include a valve that has a fuel injection rate shaping feature. By varying the amperage for the valve actuator, rate shaping can be achieved without the necessity for modifying the injector assembly, or modifying the output pressure before the pressurized fuel reaches the injector nozzle, or modifying the nozzle itself to control the nozzle spray pattern. Injection pressure control is used instead of throttling the fuel flow at the nozzle to achieve effective rate shaping.

Controlled pressure relief by the valve accommodates a small amount of dimensional tolerance for obtaining an intermediate position of the spool valve so that the control valve may achieve, within a calibrated range of positions, an optimum rate shaping characteristic. This rate shaping is used near the beginning of the injection event before the top-dead-center position of the engine piston.

The disclosure of the '419 patent is incorporated herein by reference.

SUMMARY OF THE INVENTION

The invention makes it possible to calibrate a fuel injector by establishing a so-called boot current level for the control valve actuator. Dimensional tolerances and other variables in the design and construction of fuel injectors for internal combustion engines make it necessary to individually calibrate each fuel injector for each cylinder of a particular engine with which the injectors are used. The calibration process includes a series of steps that comprises the present invention.

In practicing the method of the present invention, a boot current level is initially established based on prior experience. The injector is then tested with that boot current level, and the stability of the boot phase of the injection event is evaluated. If stability is confirmed, then a search algorithm is started to find the limits of the boot current level.

This test is done typically at two engine speeds, such as 650 rpm and 900 rpm. The method steps of the present invention make it possible to establish the upper limit and the lower limit for the boot current at each engine speed. The tests further will determine where within the calibrated upper and lower limits the boot current level of a particular injector will fall. A boot current in excess of the upper limit may result in injector instability. Similarly, a boot current that is lower than the lower limit will result in an unstable injector. Injector boot instability will result in poor engine performance, power and emissions.

The boot current level is incremented up or down at each step in the calibration method. The increment becomes smaller until a reliable limit is found. Any boot current level that will develop an unstable boot pressure (i.e., one falling outside the limits placed on the calibrator) will result in poor engine performance and emissions.

The determination of the low limit and the high limit for the boot current makes it possible to calculate a set point value. That set point value is corrected using an empirical correction based on observed differences between behavior of the injector on the injector calibration stand and the behavior of the same injector when it is mounted on a given engine. Thus, the calibrated boot current that is determined using the present method is not necessarily the algebraic average of the high value and the low value. The calibrated boot current established using the present calibration method will fall, however, within the upper and lower limits.

In practicing the method of the invention, the injector is calibrated by choosing an initial boot current level, as previously mentioned, and then incrementing the initial boot current several times. The increment is progressively decreased in successive steps, each step being followed by a determination of whether the corresponding boot current is too low or too high to maintain injector boot pressure stability. The final boot current determined in the final step is used to calibrate the boot current set point which is delivered to the engine controller as a coded value during the engine assembly process. The information may be transferred to the engine ECU in many ways including bar coding, human read and manually entered, by association to a database, etc.

DETAILED DESCRIPTION OF THE PREFERRED EMBODIMENT

Figure 1:
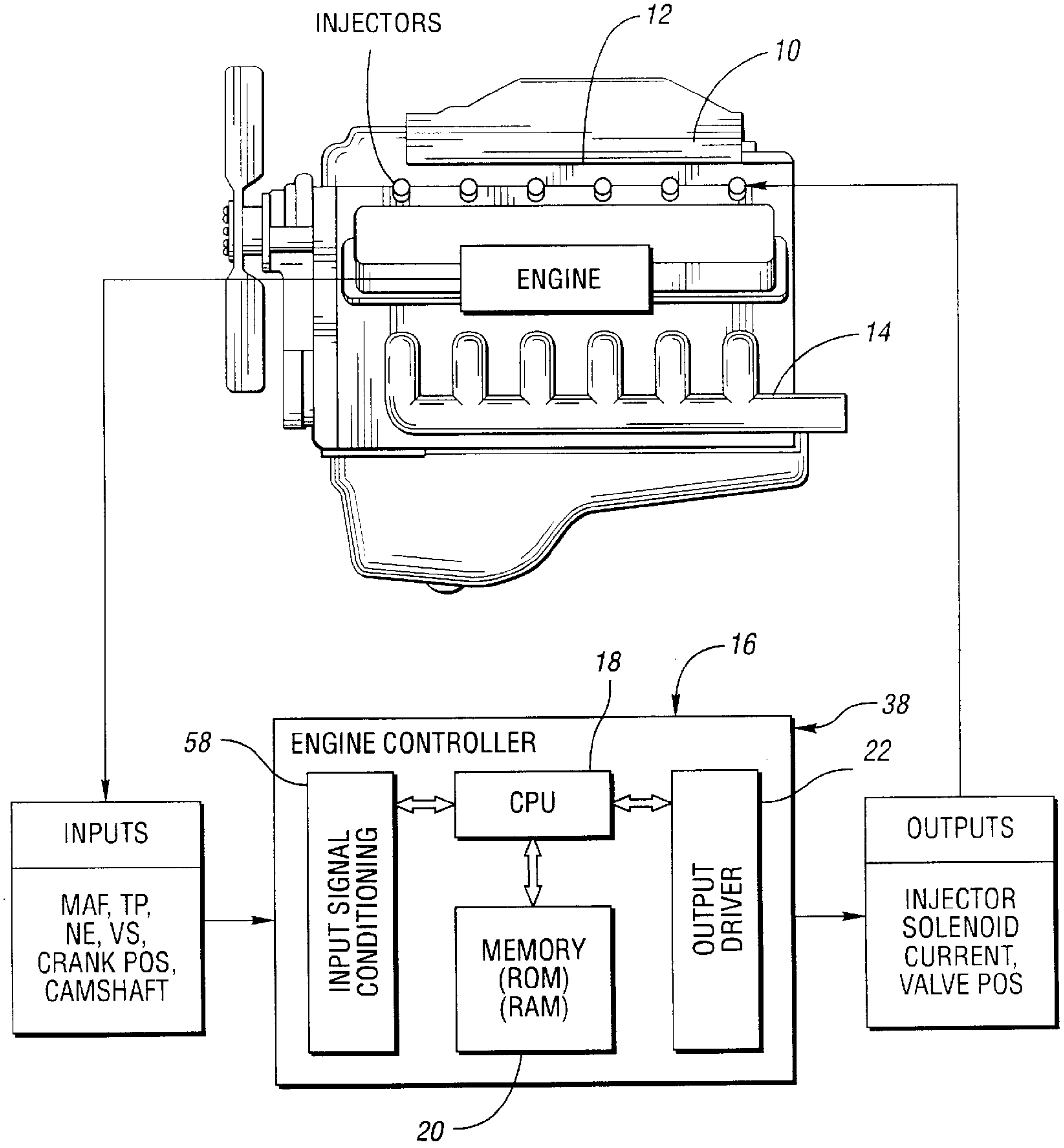
Fig. 1 (PRIOR ART)
FIG. 1 is a schematic system diagram showing an engine with multiple fuel injectors and an engine controller in the form of a microprocessor for controlling engine functions, including operating variables for the injectors.

FIG. 1 shows in schematic block diagram form an engine control system that includes injectors calibrated using the calibration method of the invention. An internal combustion engine is shown at 10. It includes multiple cylinders and crankshaft-driven pistons in the cylinders, which define combustion chambers that are supplied with fuel by fuel injectors schematically shown at 12. Combustion exhaust gases from the combustion chambers are distributed to an exhaust manifold 14. An electronic microprocessor controller 16 controls the engine performance including the fuel delivery rate and injection timing of the injectors 12.

The input variables for the controller 16 may include the mass air flow rate, the throttle position, the engine speed, the vehicle speed and the crankshaft position. These variables are delivered to the input signal conditioning portion of the processor 16. The central processing unit 18 of the microprocessor 16 acts upon the input signals using control strategy stored in the ROM portion of memory registers 20 to produce output signals delivered to the injectors by the output driver circuitry shown at 22.

Figure 1A:
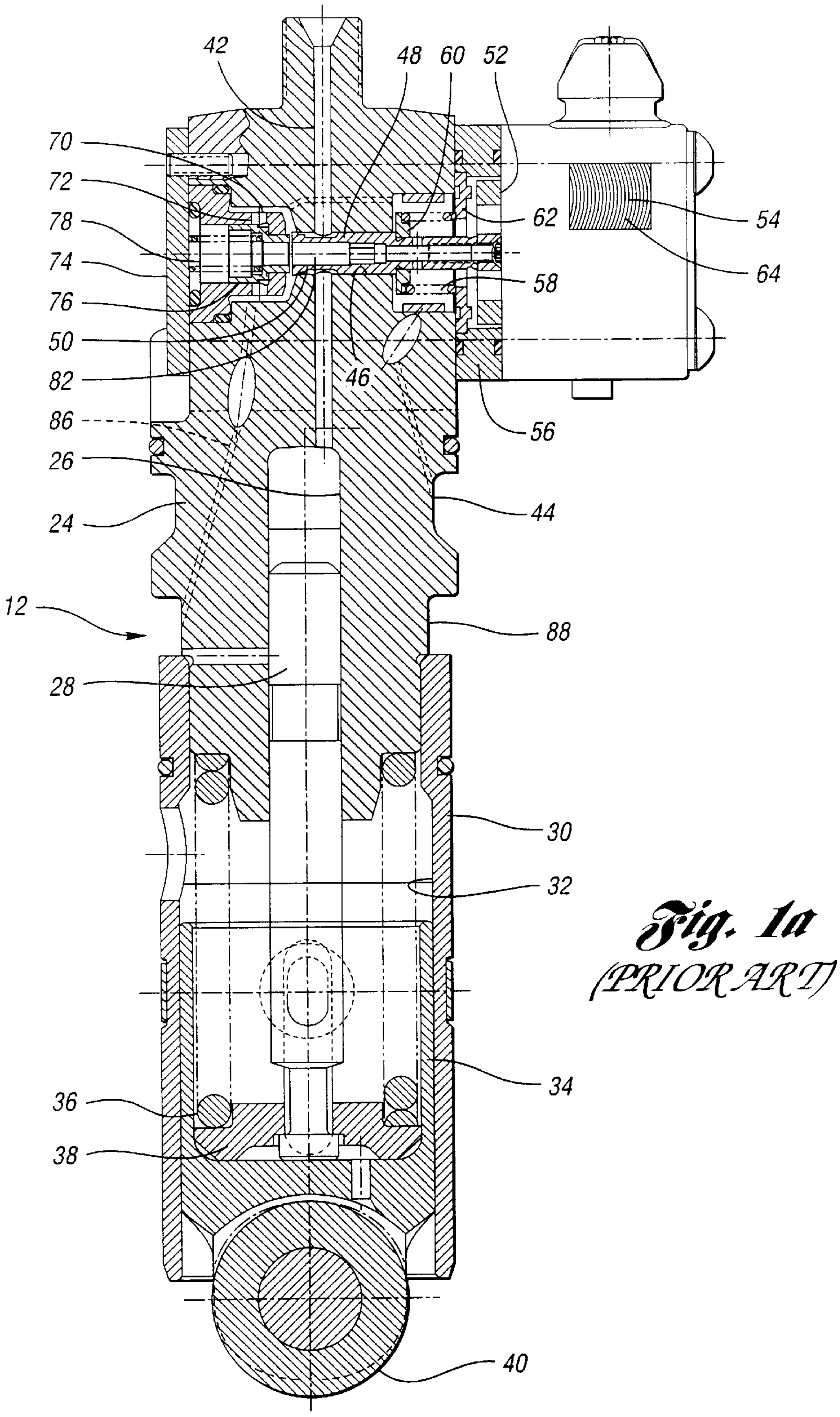
Fig. 1a (PRIOR ART)
FIG. 1*a* is a cross-sectional view of a fuel injector pump assembly or use with an internal combustion engine.

A cross-sectional view of an injector is shown in FIG. 1*a*. Although the invention will be described with reference to the design of FIG. 1*b*, the invention may be used as well with the injector disclosed in U.S. Pat. No. 6,158,419, previously identified.

The unit injector pump includes an injector pump housing 24 having a central pumping cylinder 26 in which is received pump piston 28. An injector sleeve 30 surrounds the lower portion of the injector body 24 and cooperates with the injector body to define a spring chamber 32. A spring plunger 34, positioned within the sleeve 30, defines spring chamber 32. Spring 36 is received in spring chamber 32 and is seated on the lower end of the injector body 24. The opposite end of the spring chamber receives a spring seat 38.

The plunger 34 has a cam follower 40 carried at its lower end. The follower 40 engages cam surfaces on the engine crankshaft. The plunger 34 is driven by the engine crankshaft, thereby compressing the spring 36 as a piston-driving force is applied to the piston 28. The piston 28 reciprocates in the cylinder 26 to produce fuel delivery pulses in a fuel delivery passage 42 in the upper portion of the injector body 24. Passage 42 extends to a fuel injector nozzle, not shown, which delivers fuel to a combustion chamber of the engine.

A fuel supply passage communicates with an annular groove 44 in the injector housing. The fuel supply passage extends to a low pressure fuel pump, not shown, in the engine system.

Passage 42 is in fluid communication with valve chamber 46 in which is positioned fuel control valve spool 48. The spool 48 has an annular groove 50, which permits passage of high pressure fuel through the passage 42.

The valve spool 48 has a mechanical connection with the stator 52 of solenoid actuator 54. A stator spacer ring 56 is situated between the actuator 54 and the outer surface of injector housing 24.

A valve spring 58 acts on valve seat 60 carried by the valve spool 48. The opposite end of the spring 58 is seated on a valve seat 62 at one end of the spring chamber for spring 58.

The actuator 54 includes electromagnetic windings 64. When the windings are energized, the stator 52 is shifted in the right-hand direction, as shown in FIG. 1*a*, against the force of spring 58. As will be explained with reference to FIG. 2, this closes the flow of fluid from the passage 42 to fuel chamber 70. A valve stop 72 is situated in the chamber 70.

Chamber 70 is sealed by closure plate 74, against which valve stop 72 is seated. A stop piston 76 is positioned within a central opening in the stop 72. It is biased in a right-hand direction by stop piston spring 78, which is seated on the closure plate 74. The right-hand end of the piston 76 is engaged by the left end of the spool valve 48 when the spool valve is shifted by spring 58 to an open position.

Fuel is supplied to the spring chamber for spring 58. Fuel passes through radial ports 80 in the valve spool 48, thereby providing communication between the spring chamber for spring 58 and the interior of central opening 82 in the valve spool. Fuel may pass from the opening 70 for the stop 72 into internal fuel transfer passage 86, which communicates with an annular groove 88 in the housing 24. The groove 88 communicates with a flow return passage back to the engine fuel pump.

Figure 2:
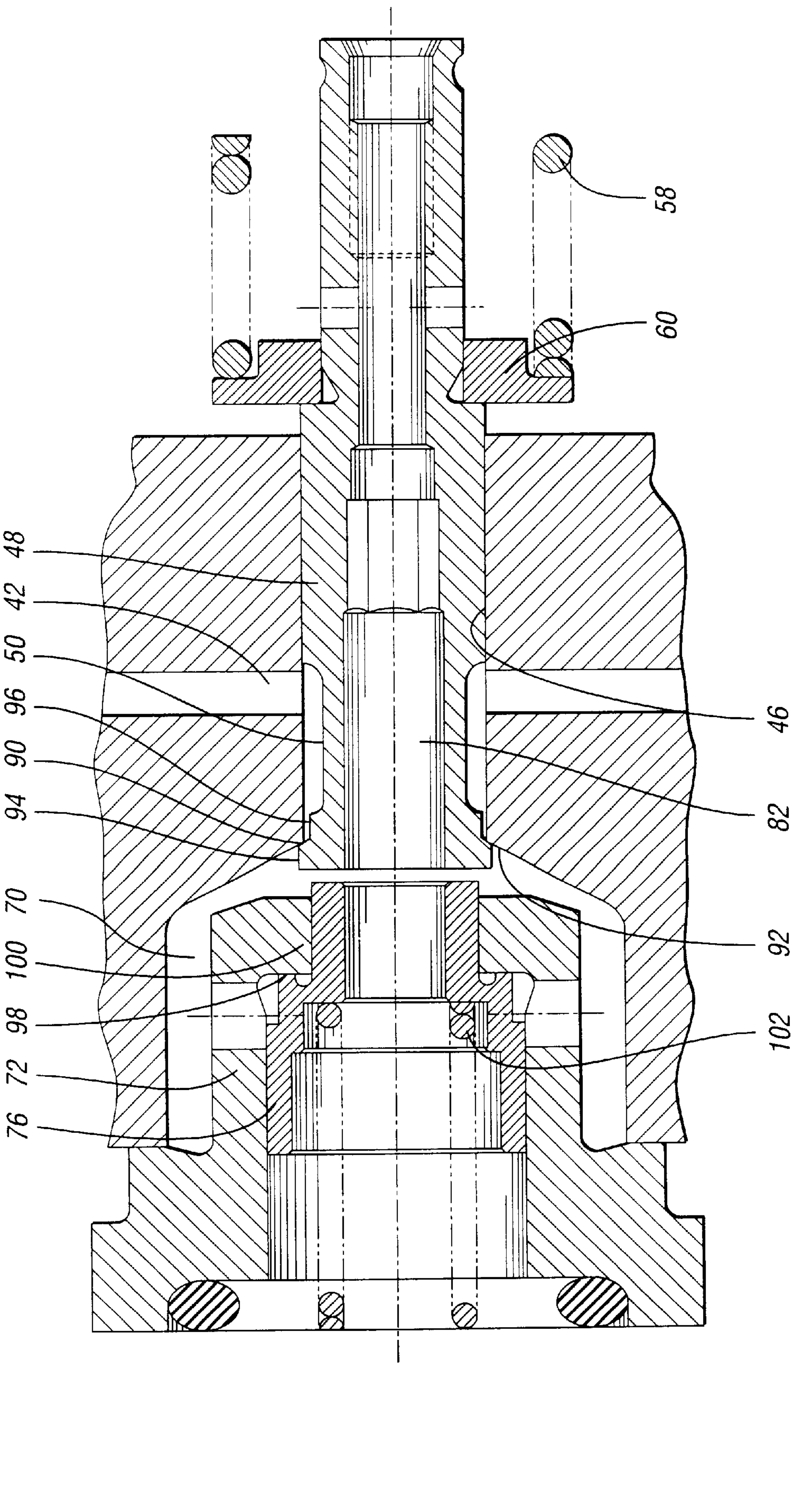
Fig. 2 (PRIOR ART)
FIG. 2 is a cross-sectional view of a control valve for use in the assembly of FIG. 1*a;*
Figure 3A:
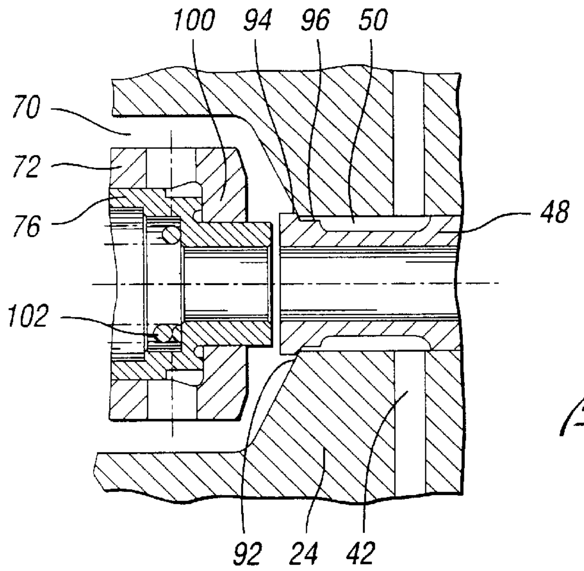
Fig. 3a (PRIOR ART)
FIG. 3*a* is a partial cross-sectional view of the control valve of FIG. 2 when the valve is in the closed position.

FIGS. 2 and 3*a* show in cross-sectional form the stop piston and the fuel control valve spool when the valve spool is in its closed position. The valve spool has a valve land 90, which engages an annular valve seat 92 surrounding the left end of the valve chamber 46. The valve land 90 has a large diameter portion 94 and a smaller diameter portion 96. The large diameter portion 94 directly engages the valve seat 92. The smaller diameter portion 96 is located within the valve chamber and is sized to provide a small clearance between the valve spool and the wall of the valve chamber 46. The annular groove 50 in the valve spool continuously registers with and communicates with high pressure fuel delivery passage 42 as the valve spool is shifted axially from one limiting axial position to the other. The groove 50 does not communicate with the fuel chamber 70, however, when the valve spool is shifted to the right, as shown in FIGS. 2 and 3*a*.

When the stop piston 76 is positioned as shown in FIGS. 2 and 3*a*, a shoulder 98 on the stop piston 76 engages the surrounding stop portion 100. The stop piston 76 normally is biased against the stop portion 100 by compression spring 102.

Figure 3B:
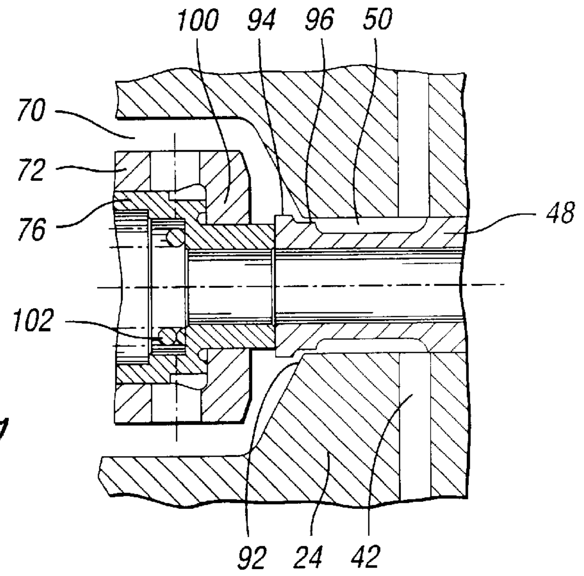
Fig. 3b (PRIOR ART)
FIG. 3*b* is a partial cross-sectional view of the control valve of FIG. 2 when the valve is in an intermediate flow regulating position.
Figure 3C:
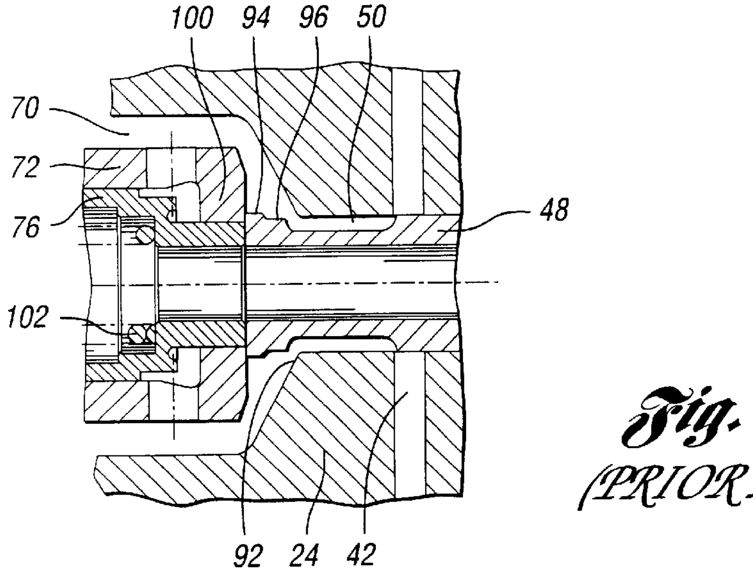
Fig. 3c (PRIOR ART)
FIG. 3*c* is a partial cross-sectional view of the control valve of FIG. 2 when the valve is in the fully open position.

FIG. 3*c* shows the valve spool 48 in a fully open position. At that time, the actuator is not energized. Thus, valve spring 58 shifts the valve spool 48 directly against the stop portion 100 of the valve stop 72. Pressurized fluid from passage 42 then can be bypassed through the annular groove 50 and past the open valve land portions 94 and 96.

When the valve is in the position shown in FIG. 3*a*, the stop piston 76 is disengaged from the valve spool 48. When the valve spool is in the position shown in FIG. 3*c*, however, the stop plunger 76 is shifted against the opposing force of the spring 102, and the valve spool 48 is seated on the stop portion 100 of the valve stop 72.

When the electromagnetic actuator is partially energized, the valve will assume an intermediate position, as shown in FIG. 3*b*. At that time, valve land portion 96 provides a restricted flow passage between high pressure delivery passage 42 and the fuel chamber 70. The design of the valve will result in a restricted flow throughout a range of valve positions. This accommodates dimensional tolerances in the manufacture and calibration of the injector valve assembly. Thus, tolerances can be accommodated without affecting the bypass flow characteristics of the control valve. The pressure in passage 42 can be regulated, therefore, with a high degree of accuracy as the control valve is balanced between opposing spring forces of the spring 102 and the valve spring 58, shown in FIG. 1*a* and FIG. 2.

Figure 4:
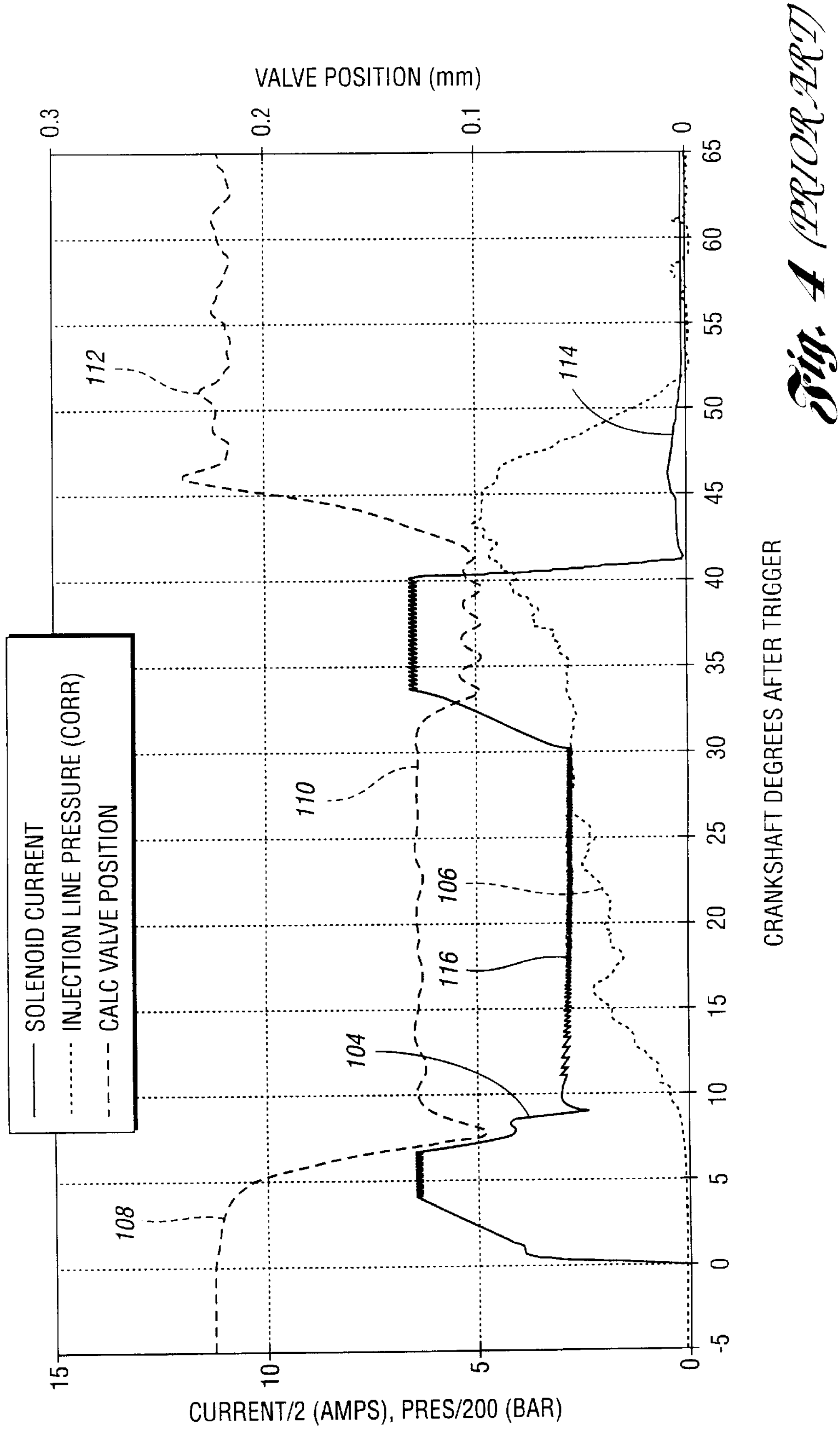
Fig. 4 (PRIOR ART)
FIG. 4 is a chart that shows solenoid actuator current, injection line pressure for the injector, and valve position during an injection event.

FIG. 4 shows a plot of the solenoid current at 104 at various crankshaft positions. As the solenoid current is varied, the position of the control valve will change as shown in the plot of FIG. 4 at 106. The line pressure will vary, as seen in the plot of FIG. 4, from a high value at 108 as the valve spool is shifted to its open position. As the valve land portion 94 again determines the injection pressure, the pressure will rise again as shown at 112.

The solenoid current that establishes the valve position shown at 112 in FIG. 4 has essentially a zero value, as shown at 114.

The so-called boot current that determines the position of the valve when the pressure is regulated by the land portion 96 is indicated in FIG. 4 at 116.

Figure 6:
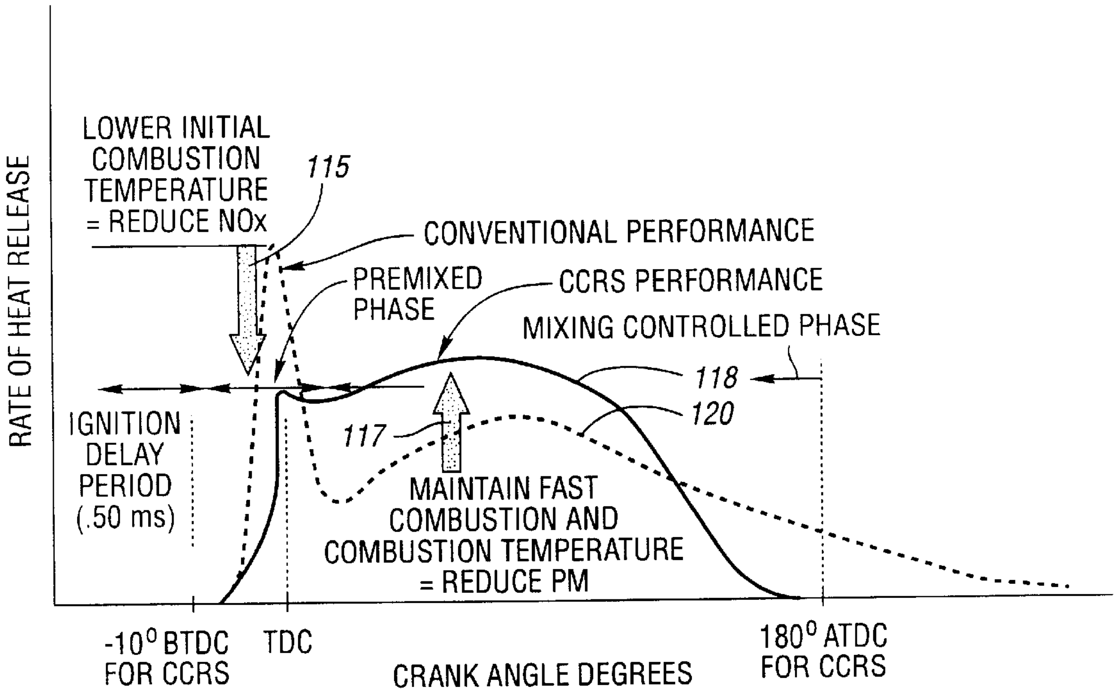
FIG. 6 is a plot of fuel delivery rate (heat release rate) versus crankshaft position during an injection event for a typical fuel injected internal combustion engine with and without injection rate shaping and other advanced combustion enhancements which might be used to reduce emissions while maintaining good efficiency.

FIG. 6 shows a fuel heat release plot versus crankshaft position. The current controlled rate shaping feature made possible by an injector calibrated using the method of the present invention is shown by the solid line. The fuel heat release peak value occurs before top dead center at a lower peak value than the corresponding peak value of the fuel heat release plot for a conventional injector that does not include the current-controlled rate shaping feature of the invention. This conventional performance plot is shown dotted. The timing of the peak for the fuel heat release relative to top dead center and the magnitude of the peak for the current controlled rate shaping of the invention improve combustion efficiency, as explained in previously identified U.S. Pat. No. 6,158,419. The improvement in the combustion process made available by an injector calibrated in accordance with the present invention allows more precise rate shaping than existing injector nozzle assemblies.

The ignition delay period is measured in time units (e.g., 0.50 ms). It is the time between the start of injection until the start of combustion. The start of combustion may be −10° before top dead center in the case of the present invention. The peak rate of heat release, in the case of conventional performance, occurs near top dead center.

The peak rate of heat release is greatly influenced by the amount of fuel injected during the ignition delay period since this fuel tends to burn in the premixed phase. This results in high combustion temperatures and higher $NO_x$ emissions in the conventional pre-mixed phase. This characteristic is indicated by the directional arrow 115.

Since the amount of fuel injected in the ignition delay period is less in the case of the present invention than in the case of conventional performance, the temperature and the rate of heat release during the mixing controlled phase in the case of the present invention is increased, which results in a reduction in the amount of particulate matter (PM) in the engine exhaust. This characteristic is indicated by the directional arrow 117.

Figure 5:
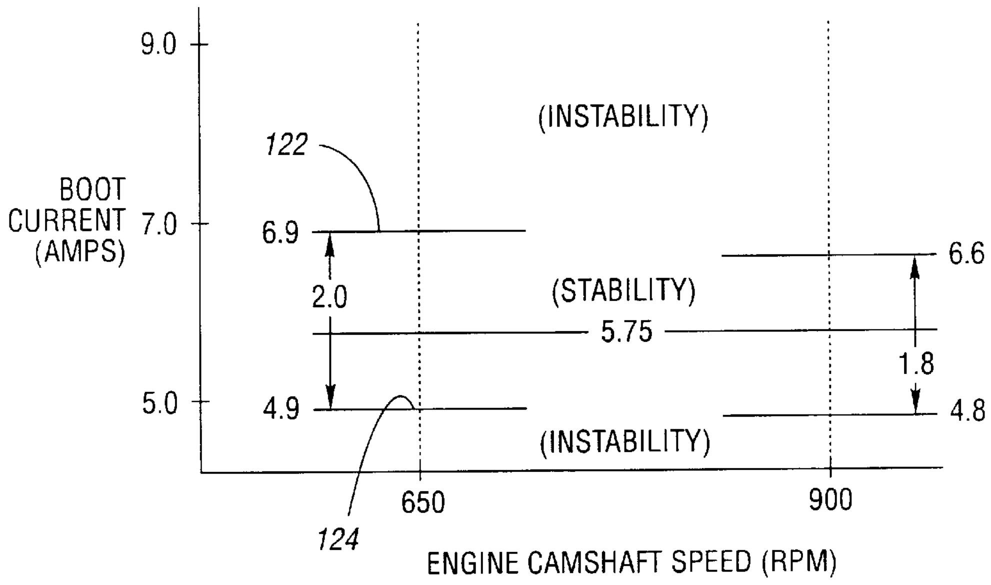
FIG. 5 is a chart that shows an example of the upper and lower limits for the boot current within which the injector is stable at each of two engine speeds.

The present invention uses an algorithm that is stored in the memory of the calibrator. The algorithm makes it possible for the calibrator controller to search for the maximum and minimum stable boot currents at chosen speeds. The maximum stable boot current limit at 650 engine camshaft rpm is generally indicated in FIG. 5 at 122. The lower or minimum stable boot current limit is shown at 124. The boot current that will maintain engine performance is any current between the upper and lower limits shown at 122 and 124. If the boot current is higher than the upper limit, the injector becomes unstable. Similarly, if the boot current is below the lower limit 124, the injector becomes unstable.

In the example shown in FIG. 5, typical boot current maximum and minimum limits are established at 650 rpm engine camshaft speed and at 900 rpm engine camshaft speed. Other speeds and other limits, other than those shown in FIG. 5, of course, may be used depending upon calibration variations from engine to engine.

The algorithm stored in the memory of the calibrator will establish the upper and lower limits for each injector following its manufacture before the injector is installed in the engine. After the upper and lower limits for a given injector are determined, the injector is marked with a suitable code that contains information regarding fuel delivery classification and boot current level required. This code is transferred to the engine controller 16 and stored in memory. This enables more precise control of fuel delivery for each cylinder so that each cylinder receives the optimum fuel quantity at an optimum rate for each injection event.

The most desirable boot current level for each pump is provided to the engine controller via the above-mentioned code. It is desirable to maintain a maximum distance from each of the limits in the plot of FIG. 5. A suitable correlation offset can be included so that the best boot current level is not necessarily the algebraic mean of the upper and lower limits. This correlation offset is an empirical offset determined by experience by taking into account the expected differences in the boot current calculated during calibration of a particular injector and the corresponding performance of that injector when it is installed in an actual engine environment.

Figure 7A:
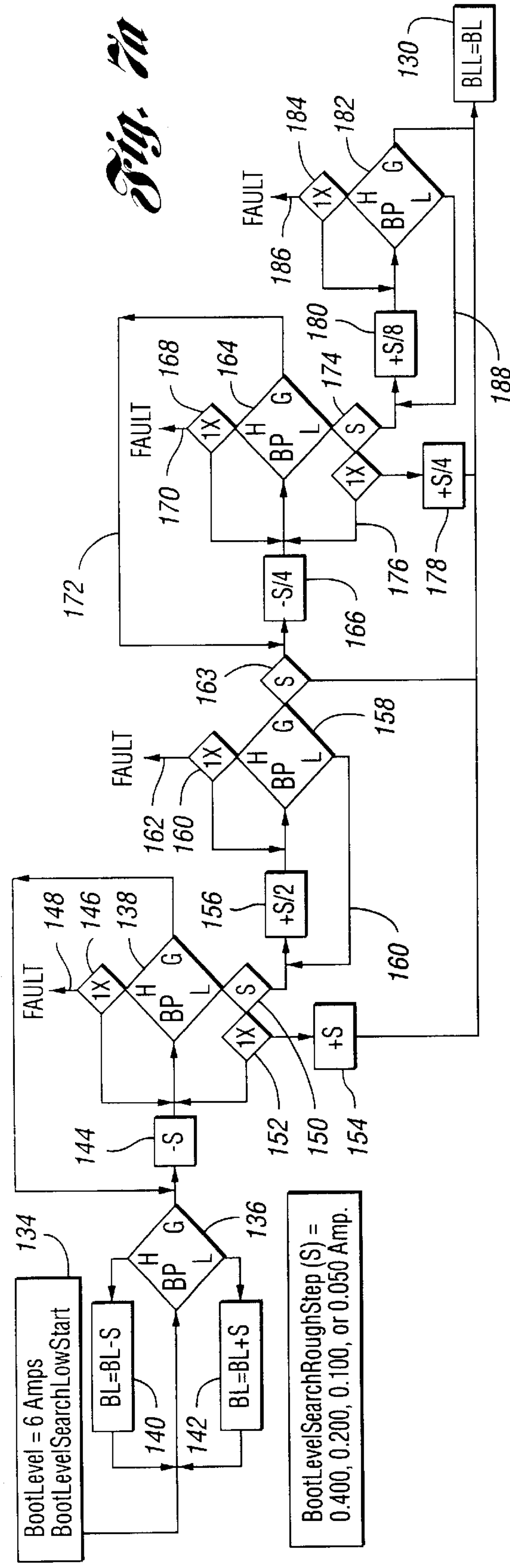
FIGS. 7*a* and 7*b* show flowcharts that demonstrate the various steps employed in the calibration method of the invention.
Figure 7B:
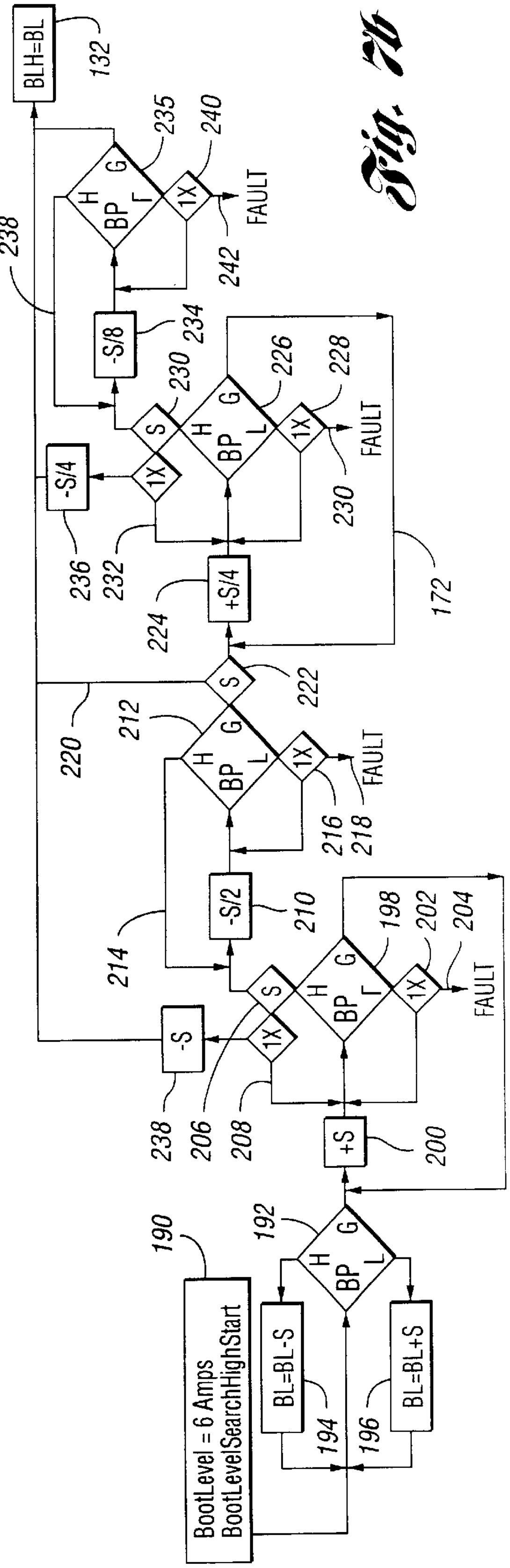

FIGS. 7*a* and 7*b* show flow diagrams that represent the method steps used in determining the upper and lower limits for the boot current shown in FIG. 5. This method is carried out for each chosen engine speed. In the case of the example shown in FIG. 5, the method is carried out at an engine speed of 650 rpm and 900 rpm. Upper and lower limits are calculated for each engine speed.

The algorithm for the method steps of FIGS. 7*a* and 7*b* will make it possible to find, respectively, the lowest boot current level at output port 130 and the highest boot level current at output port 132. The boot pressure that results from any boot current between the upper and lower limits will produce a so-called good value.

At the beginning of the routine illustrated in FIG. 7*a*, a starting value for the boot current level is chosen at action block 134. For purposes of this discussion, it will be assumed that the boot current level that initially is chosen for carrying out the routine is 6 amps. The corresponding boot pressure is evaluated using the routines of FIG. 7*a* by measuring the average boot pressure during a specific period of the cycle. A number of cycles can be evaluated to ensure that an accurate reading is obtained.

During the routine shown in FIG. 7*a*, which will establish a lower limit, a boot level current of 6 amps, for example, is delivered to the decision block 134. It is determined at decision block 136 whether the corresponding boot pressure will cause injector stability. If the injector is stable, the routine will proceed to the next step because the boot pressure is good (G). If the boot pressure is high, the routine will proceed to subtract a step value of 0.4 amps, as shown at 140, and the result of that computation is again tested to see whether the boot pressure resulting from the reduced boot level current is still high. On the other hand, if the test at decision block 136 determines that the initial value of 6 amps is too low (L) to maintain injector stability, the routine will add a step value S of 0.4 amps at action block 142. This new value for the boot level current again is tested at decision block 136.

As it continues in this fashion, this routine will result in a so-called good reading (G). In order to define further the results determined at decision block 136, the routine will "narrow in" the calculation by incrementally decreasing the step size. This is done beginning at step 144. A decrease of 0.4 amps from the initial value of 6 amps, for example, is made at action block 144, and then that value is tested at decision block 138 to determine whether the value of 5.6 is high (H), low (L) or good (G).

Test block 138 searches for the next lower boot current level that will produce a low (L) boot pressure. It uses an increment of −S (−0.4 amps for our example). For this example, the previous test block (136) has shown that a boot current of 5.6 amps produces a good (G) boot pressure. Block 144 now decreases that 5.6 amps to 5.2 amps.

If test block 138 indicates that 5.2 amps produces a high (H) boot pressure, this result is illogical and the same boot current level is tested one more time as indicated in block 146. If test block 138 indicates an illogical high (H) boot pressure a second time, then the search is stopped with a fault, as indicated at arrow 148.

If test block 138 indicates that the boot pressure is good (G), the routine is then returned back to action block 144, where the boot current level is decreased again by an increment (−S) from 5.2 to 4.8, and the resulting boot pressure is tested again in test block 138.

If test block 138 indicates that the boot pressure is low (L), the routine first determines whether the increment (S) is as small as possible. If the increment (S) is at or below its smallest allowable value, as checked at block 150, the same boot current level will be tested one more time as indicated in arrow 152. If test block 138 indicates a low (L) boot pressure a second time, then the BootLevelHighSearch is complete. Block 154 will add an increment (S) since the last boot current level produced a low (L) boot pressure, and the routine will pass its final value to output port 130. Or, if the increment (S) is not at its smallest allowable value, as checked at block 150, the routine will go on towards test block 158 where the next smaller increment will be used.

Test block 158 searches for the next higher boot current level that will produce a good (G) boot pressure. It uses an increment of +S/2 (0.2 amps for our example). For this example, the previous test block (138) has shown that a boot current of 4.8 amps produces a low (L) boot pressure. Block 156 now increases that 4.8 amps to 5.0 amps.

If test block 158 indicates that 5.0 amps produces a high (H) boot pressure, this result is illogical and the same boot current level is tested one more time, as indicated in block 160. If test block 158 indicates an illogical high (H) boot pressure a second time, then the search is stopped with a fault, as indicated at arrow 162.

If test block 158 indicates that the boot pressure is low (L), the routine follows arrow 160 back to action block 156 where the boot current level is increased again by an increment (+S/2) from 5.0 to 5.2, and the resulting boot pressure is tested again in test block 158.

If test block 158 indicates that the boot pressure is good (G), the routine first determines whether the increment (S/2) is as small as possible. If the increment (S/2) is at or below its smallest allowable value, as checked at block 163, then the BootLevelHighSearch is complete, and the routine will pass its final value to output port 130. Or, if the increment (S/2) is not at its smallest allowable value, as checked at block 163, the routine will go on towards test block 164 where the next smaller increment will be used.

Test block 164 searches for the next lower boot current level that will produce a low (L) boot pressure. It uses an increment of −S/4 (−0.1 amps for our example). For this example, the previous test block (158) has shown that a boot current of 5.2 amps produces a good (G) boot pressure. Block 166 now decreases that 5.2 amps to 5.1 amps.

If test block 164 indicates that 5.1 amps produces a high (H) boot pressure, this result is illogical and the same boot current level is tested one more time as indicated in block 168. If test block 164 indicates an illogical high (H) boot pressure a second time, then the search is stopped with a fault, as indicated at arrow 170.

If test block 164 indicates that the boot pressure is good (G), the routine follows arrow 172 back to action block 166 where the boot current level is decreased again by an increment (−S/4) from 5.1 to 5.0, and the resulting boot pressure is tested again in test block 164.

If test block 164 indicates that the boot pressure is low (L), the routine first determines whether the increment (S/4) is as small as possible. If the increment (S/r) is at or below its smallest allowable value, as checked at block 174, the same boot current level will be tested one more time as indicated in arrow 176. If test block 164 indicates a low (L) boot pressure a second time, then the BootLevelHighSearch is complete. Block 178 will add an increment (+S/4) since the last boot current level produced a low (L) boot pressure, and the routine will pass its final value to output port 130. Or, if the increment (S/4) is not at its smallest allowable value, as checked at block 174, the routine will go on towards test block 182 where the next smaller increment will be used.

Test block 182 searches for the next higher boot current level that will produce a good (G) boot pressure. It uses an increment of +S/8 (0.05 amps for our example). For this example, the previous test block (164) has shown that a boot current of 5.0 amps produces a low (L) boot pressure. Block 180 now increases that 5.0 amps to 5.05 amps.

If test block 182 indicates that 5.05 amps produces a high (H) boot pressure, this result is illogical and the same boot current level is tested one more time as indicated in block 184. If test block 182 indicates an illogical high (H) boot pressure a second time, then the search is stopped with a fault, as indicated at arrow 186.

If test block 182 indicates that the boot pressure is low (L), the routine follows arrow 188 back to action block 180, where the boot current level is increased again by an increment (+S/8) from 5.05 to 5.1, and the resulting boot pressure is tested again in test block 182.

If test block 182 indicates that the boot pressure is good (G), then the BootLevelHighSearch is complete, and the routine will pass its final value to output port 130.

The routine for establishing the high limit, which is shown in FIG. 7*a*, is substantially similar to the routine described with reference to FIG. 7*a* for determining the lower limit. As in the case of the routine in FIG. 7*a*, the boot level amperage (for example, 6 amps) may be entered at action block 190. The algebraic signs for the boot level current steps in FIG. 7*a* are opposite from the signs for corresponding boot level current increments described with reference to FIG. 7*a*. In other respects, the routines of FIGS. 7*a* and 7*b* are similar.

The initial boot level of 6 amps produces a boot pressure, which is tested at decision block 192. If it is high, a boot current level increment of 0.4 is subtracted at action block 194 and the test at 192 is repeated. If the result of the test at decision block 192 indicates a low boot pressure, a boot current level increment of 0.4 amps is added at action block 196. This routine is repeated until a good result (G) is obtained.

Test block 198 searches for the next higher boot current level that will produce a high (H) boot pressure. It uses an increment of S (0.4 amps for our example). For this example, the previous test block (192) has shown that a boot current of 6.4 amps produces a good (G) boot pressure. Block 200 now increases that 6.4 amps to 6.8 amps.

If test block 198 indicates that 6.8 amps produces a low (L) boot pressure, this result is illogical and the same boot current level is tested one more time as indicated in block 202. If test block 198 indicates an illogical low (L) boot pressure a second time, then the search is stopped with a fault, as indicated at arrow 204.

If test block 198 indicates that the boot pressure is good (G), the routine is then returned back to action block 200, where the boot current level is increased again by an increment (S) from 6.8 to 7.2, and the resulting boot pressure is tested again in test block 198.

If test block 198 indicates that the boot pressure is high (H), the routine first determines whether the increment (S) is as small as possible. If the increment (S) is at or below its smallest allowable value, as checked at block 206, the same boot current level will be tested one more time as indicated in arrow 208. If test block 198 indicates a high (H) boot pressure a second time, then the BootLevelHighSearch is complete. Block 244 will subtract an increment (S) since the last boot current level produced a high (H) boot pressure, and the routine will pass its final value to output port 132. Or, if the increment (S) is not at its smallest allowable value, as checked at block 206, the routine will go on towards test block 212 where the next smaller increment will be used.

Test block 212 searches for the next lower boot current level that will produce a good (G) boot pressure. It uses an increment of −S/2 (−0.2 amps for our example). For this example, the previous test block (198) has shown that a boot current of 7.2 amps produces a high (H) boot pressure. Block 210 now decreases that 7.2 amps to 7.0 amps.

If test block 212 indicates that 7.0 amps produces a low (L) boot pressure, this result is illogical and the same boot current level is tested one more time as indicated in block 216. If test block 212 indicates an illogical low (L) boot pressure a second time, then the search is stopped with a fault, as indicated at arrow 218.

If test block 212 indicates that the boot pressure is high (H), the routine follows arrow 214 back to action block 210 where the boot current level is decreased again by an increment (−S/2) from 7.0 to 6.8, and the resulting boot pressure is tested again in test block 212.

If test block 212 indicates that the boot pressure is good (G), the routine first determines whether the increment (S/2)) is as small as possible. If the increment (S/2)) is at or below its smallest allowable value, as checked at block 222, then the BootLevelHighSearch is complete, and the routine will pass its final value to output port 132. Or, if the increment (S/2)) is not at its smallest allowable value, as checked at block 222, the routine will go on towards test block 226, where the next smaller increment will be used.

Test block 226 searches for the next higher boot current level that will produce a high (H) boot pressure. It uses an increment of S/4 (0.1 amps for our example). For this example, the previous test block (212) has shown that a boot current of 6.8 amps produces a good (G) boot pressure. Block 224 now increases that 6.8 amps to 6.9 amps.

If test block 226 indicates that 6.9 amps produces a low (L) boot pressure, this result is illogical and the same boot current level is tested one more time as indicated in block 228. If test block 226 indicates an illogical low (L) boot pressure a second time, then the search is stopped with a fault, as indicated at arrow 248.

If test block 226 indicates that the boot pressure is good (G), the routine follows arrow 246 back to action block 224 where the boot current level is increased again by an increment (S/4)) from 6.9 to 7.0, and the resulting boot pressure is tested again in test block 226.

If test block 226 indicates that the boot pressure is high (H), the routine first determines whether the increment (S/4) is as small as possible. If the increment (S/4) is at or below its smallest allowable value, as checked at block 230, the same boot current level will be tested one more time as indicated in arrow 232.

If test block 226 indicates a high (H) boot pressure a second time, then the BootLevelHighSearch is complete. Block 236 will subtract an increment (S/4) since the last boot current level produced a high (H) boot pressure, and the routine will pass its final value to output port 132. Or, if the increment (S/4) is not at its smallest allowable value, as checked at block 230, the routine will go on towards test block 235 where the next smaller increment will be used.

Test block 235 searches for the next lower boot current level that will produce a good (G) boot pressure. It uses an increment of −S/8 (−0.05 amps for our example). For this example, the previous test block (226) has shown that a boot current of 7.0 amps produces a high (H) boot pressure. Block 234 now decreases that 7.0 amps to 6.95 amps.

If test block 235 indicates that 6.95 amps produces a low (L) boot pressure, this result is illogical and the same boot current level is tested one more time as indicated in block 240. If test block 235 indicates an illogical low (L) boot pressure a second time, then the search is stopped with a fault, as indicated at arrow 242.

If test block 235 indicates that the boot pressure is high (H), the routine follows arrow 238 back to action block 234 where the boot current level is decreased again by an increment (−S/8) from 6.95 to 6.9, and the resulting boot pressure is tested again in test block 235.

If test block 235 indicates that the boot pressure is good (G), then the BootLevelHighSearch is complete, and the routine will pass its final value to output port 132.

Although a particular embodiment of the invention has been disclosed, it will be apparent to persons skilled in the art that modifications may be made without departing from the scope of the invention. All such modifications and equivalents thereof are intended to be covered by the following claims.

What is claimed is:

1. A method for calibrating a solenoid-operated fuel flow control valve assembly for a fuel injector for an internal combustion engine, the injector comprising an engine-driven fuel pump piston in a fuel pumping chamber, a nozzle portion of the injector communicating with the pumping chamber through a fuel delivery passage, the valve assembly including a movable valve spool in the fuel delivery passage, the method comprising the steps of:

choosing an initial boot current level for the control valve assembly that will effect displacement of the valve spool to a fuel pressure regulating position intermediate a low fuel pressure position and a maximum fuel pressure position during a fuel injection event;

determining whether the chosen initial boot current results in a corresponding boot pressure that will achieve injector stability;

incrementing or decrementing the initial boot current depending upon whether the initial boot current is too low or too high, respectively, to maintain injector stability; and changing the initial boot current in successive steps to establish a final lower limit for the boot current below which the boot injection becomes unstable, each successive step being followed by a determination of whether the corresponding boot pressure is too low to maintain injection stability, the boot current that is determined in the final step being delivered to the calibrated controller memory as a lower boot current limit.

2. A method for calibrating a solenoid-operated fuel control valve assembly for a fuel injector for an internal combustion engine, the injector comprising an engine-driven fuel pump piston in a fuel pumping chamber, a nozzle portion of the injector communicating with the pumping chamber through a fuel delivery passage, the valve assembly including a movable valve spool in the fuel delivery passage, the method comprising the steps of:

choosing an initial boot current level for the control valve assembly that will effect displacement of the valve spool to a fuel pressure regulating position intermediate a low fuel pressure position and a maximum fuel pressure position during a fuel injection event;

determining whether the chosen initial boot current results in a corresponding boot pressure that will achieve boot injection stability;

incrementing or decrementing the initial boot current depending upon whether the initial boot current is too low or too high, respectively, to maintain boot injection stability;

changing the initial boot current in successive steps to establish a final upper limit for the boot current above which the injector becomes unstable, each successive step being followed by a determination of whether the corresponding boot pressure is too high to maintain injector stability, the boot current that is determined in the final step being delivered to a controller memory as an upper boot current limit.

3. A method for calibrating a solenoid-operated fuel flow control valve assembly for a fuel injector for an internal combustion engine, the injector comprising an engine-driven fuel pump piston in a fuel pumping chamber, a nozzle portion of the injector communicating with the pumping chamber through a fuel delivery passage, the valve assembly including a movable valve spool in the fuel delivery passage, the method comprising the steps of:

choosing an initial boot current level for the control valve assembly that will effect displacement of the valve spool to a fuel pressure regulating position intermediate a low fuel pressure position and a maximum fuel pressure position during a fuel injection event;

determining whether the chosen initial boot current results in a corresponding boot pressure that will achieve boot injection stability;

incrementing or decrementing the initial boot current depending upon whether the initial boot current is too low or too high, respectively, to maintain boot injection stability;

changing the initial boot current in successive steps to establish a final upper limit for the boot current above which the boot injection becomes unstable, each successive step being followed by a determination of whether the corresponding boot pressure is too high to maintain injector stability, the boot current that is determined in the final increasing step being delivered to the calibrator controller memory as an upper boot current limit; and changing the initial boot current in successive steps to establish a final lower limit for the boot current below which the boot injection becomes unstable, each successive step being followed by a determination of whether the corresponding boot pressure is too low to maintain injector stability, the boot current that is determined in the final step being delivered to a controller memory as a lower boot current limit.

4. The method set forth in claim 1 wherein the step changing the initial boot current in successive steps to establish a lower boot current limit includes a determination of whether the corresponding boot pressure is too high to maintain boot injector stability, and terminating the method for calibrating the control valve assembly if the boot pressure is indicated to be too high to maintain boot injection stability.

5. The method set forth in claim 2 wherein the step of changing the initial boot current in successive steps to establish an upper boot current limit includes a determination of whether the corresponding boot pressure is too low to maintain boot injector stability, and terminating the method for calibrating the control valve assembly if the boot pressure is indicated to be too high to maintain boot injector stability.

6. The method set forth in claim 3 wherein the engine speed at which the method steps are carried out is at a first speed value whereby first upper and lower boot current limits are established and at a second engine speed value whereby second upper and lower boot current limits are established.

7. The method set forth in claim 6 wherein the final boot current set point is determined by computing the mean or other derived boot current level using the calibrated upper and lower boot current limits at each of two engine speeds and modifying the calibrated boot current set point by applying an empirical correction factor based upon known differences in performance of the injector during calibration compared to performance of the injector in an actual engine environment.

* * * * *